US010609393B2

(12) United States Patent
Oto

(10) Patent No.: US 10,609,393 B2
(45) Date of Patent: Mar. 31, 2020

(54) IMAGE ENCODING APPARATUS AND METHOD OF CONTROLLING THE SAME

(71) Applicant: CANON KABUSHIKI KAISHA, Tokyo (JP)

(72) Inventor: Hiroshi Oto, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/483,284

(22) Filed: Apr. 10, 2017

(65) Prior Publication Data
US 2017/0302938 A1 Oct. 19, 2017

(30) Foreign Application Priority Data

Apr. 14, 2016 (JP) ................................ 2016-081466

(51) Int. Cl.
*H04N 19/182* (2014.01)
*H04N 19/93* (2014.01)
(Continued)

(52) U.S. Cl.
CPC ........... *H04N 19/182* (2014.11); *H04N 19/93* (2014.11)

(58) Field of Classification Search
CPC .............................. H04N 19/182; H04N 19/93
See application file for complete search history.

(56) References Cited

U.S. PATENT DOCUMENTS 8,031,954 B2 * 10/2011 Nakagawa ........... H04N 19/105
382/238
8,588,536 B2 * 11/2013 Dikbas ................. H04N 19/147
382/232
(Continued)

FOREIGN PATENT DOCUMENTS

JP 3885413 B2 2/2007
JP 2008311792 A 12/2008
(Continued)

OTHER PUBLICATIONS

Ono et al. "Bi-level image coding with Melcode—comparison of block type code and arithmetic type code" IEEE Global Telecom Conference and Exhibition (Nov. 1989) pp. 1-6.*
(Continued)

*Primary Examiner* — Mia M Thomas
(74) *Attorney, Agent, or Firm* — Carter, DeLuca & Farrell LLP

(57) ABSTRACT

This invention makes it possible to increase an encoding efficiency and reduce redundant processing. For this, an encoding apparatus includes a first encoder which encodes a run length in which identical pixels continue, a second encoder which prediction-encodes a pixel of an encoding target, a first determiner which determines whether a pixel of interest is located within a predetermined range on a line on which the pixel of interest is located, thereby determines whether to apply the second encoder to the pixel of interest, and a second determiner which, if the pixel of interest is located outside the predetermined range, determines, by referring to an already encoded pixel located around the pixel of interest, which one of the first encoder and the second encoder is to be applied to the pixel of interest.

8 Claims, 12 Drawing Sheets

(51) Int. Cl.
*H04N 19/13* (2014.01)
*H04N 19/136* (2014.01)

(56) References Cited

U.S. PATENT DOCUMENTS

| | | | |
|---|---|---|---|
| 2002/0080408 A1* | 6/2002 | Budge | G06T 9/008 382/238 |
| 2002/0159632 A1* | 10/2002 | Chui | G06T 9/00 382/168 |
| 2002/0172427 A1* | 11/2002 | Malvar | G06T 9/004 382/238 |
| 2003/0007561 A1* | 1/2003 | Kajiwara | H04N 19/176 375/240.11 |
| 2003/0118242 A1* | 6/2003 | Nakayama | H03M 7/46 382/245 |
| 2005/0207664 A1* | 9/2005 | Ramasastry | H04N 19/63 382/240 |
| 2008/0037882 A1* | 2/2008 | Tamura | H04N 1/64 382/232 |
| 2008/0095455 A1* | 4/2008 | Hosaki | H04N 1/41 382/248 |
| 2009/0284651 A1* | 11/2009 | Srinivasan | H04N 19/50 348/425.1 |
| 2011/0249908 A1* | 10/2011 | Wasily | H04N 19/176 382/238 |
| 2012/0128064 A1* | 5/2012 | Sato | H04N 19/70 375/240.03 |
| 2017/0118492 A1* | 4/2017 | Sakamoto | H04N 19/132 |
| 2017/0302938 A1* | 10/2017 | Oto | H04N 19/182 |
| 2018/0091829 A1* | 3/2018 | Liu | H04N 19/93 |
| 2019/0028718 A1* | 1/2019 | Koyama | H04N 19/182 |
| 2019/0166180 A1* | 5/2019 | Zhao | H04N 19/15 |

FOREIGN PATENT DOCUMENTS

| | | |
|---|---|---|
| JP | 4773203 B2 | 9/2011 |
| JP | 2016005206 A | 1/2016 |

OTHER PUBLICATIONS

ISO/IEC, "Information Technology—Lossless and Near-Lossless Compression of Continuous-Tone Still Images: Baseline," First Edition, 14495-1:1999(E), Dec. 1, 1999, pp. 1-65, ISO Copyright Office, Geneva, Switzerland.

Office Action issued by the Japanese Patent Office dated Feb. 10, 2020 in corresponding Japanese Patent Application No. 2016-081466.

* cited by examiner

FIG. 6
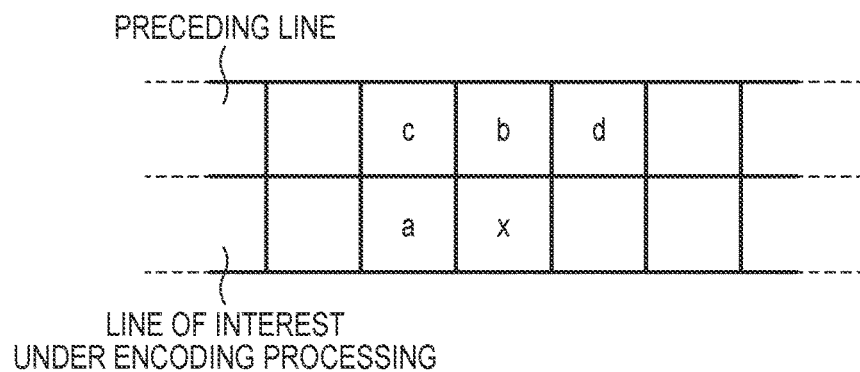
PRECEDING LINE
LINE OF INTEREST
UNDER ENCODING PROCESSING
FIG. 7
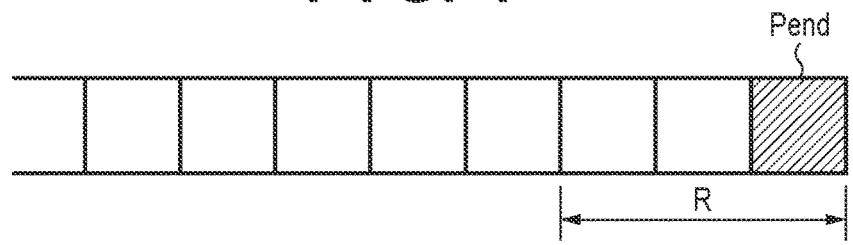
Pend
R
FIG. 8
| MV \ K | 0 | 1 | 2 |
|---|---|---|---|
| 0 | 1 | 10 | 100 |
| 1 | 01 | 11 | 101 |
| 2 | 001 | 010 | 110 |
| 3 | 0001 | 011 | 111 |
| 4 | 00001 | 0010 | 0100 |

FIG. 9

| RUN LENGTH \ J[index] | 0 | 1 | 2 | 3 |
|---|---|---|---|---|
| 0 | 0 | 00 | 000 | 0000 |
| 1 | — | 01 | 001 | 0001 |
| 2 | — | — | 010 | 0010 |
| 3 | — | — | 011 | 0011 |
| 4 | — | — | — | 0100 |

IMAGE ENCODING APPARATUS AND METHOD OF CONTROLLING THE SAME

BACKGROUND OF THE INVENTION

Field of the Invention

The present invention relates to an image data encoding technique.

Description of the Related Art

As one type of image data encoding method, there exists JPEG-LS. In JPEG-LS, lossless encoding and near-lossless encoding can be selected. Switching is performed between prediction encoding and run length encoding based on the states of the peripheral pixels around an encoding target pixel, thereby implementing a high compression ratio (literature 1 below). In prediction encoding, the pixel value of the encoding target pixel is predicted from the peripheral pixels, and a prediction error is encoded. In run length encoding of JPEG-LS, the run length (the number of consecutive data) of the same pixel value is encoded. As another method using prediction encoding and run length encoding, there is disclosed a method in which a plurality of prediction methods are prepared, and encoding of the identification information of a coincident prediction method and its run length (consecutive values) or encoding of a prediction error is selected (literature 2 below). In the prediction encoding, the pixel value of an encoding target pixel is predicted from peripheral pixels, and the prediction error is encoded by Golomb-Rice encoding. There is disclosed a method of evaluating the adequacy of a used encoding parameter after execution of Golomb-Rice encoding, performing updating, and deciding an encoding parameter to be used next (literature 3 below).

CITATION LIST

Literature 1: ITU-T T.87 (1998)|ISO/IEC 14495-1: 1999, Information Technology—Lossless and near-lossless compression of continuous-tone still images: Baseline
Literature 2: Japanese Patent No. 3885413
Literature 3: Japanese Patent No. 4773203

Consider a case in which image data is input and entropy-encoded while switching between prediction encoding and run length encoding. In literature 1, this switching is performed based on the peripheral pixels around a pixel of interest. In literature 2, run length encoding is selected if one of a plurality of prediction values using the peripheral pixels around a pixel of interest matches the pixel of interest, and prediction encoding is selected otherwise. In these related arts, however, even for a position where runs hardly continue, for example, at the right end of image data, the encoding method is switched using the same determination method. Hence, a determination error readily occurs, and redundant encoded data may be output.

SUMMARY OF THE INVENTION

According to an aspect of the invention, there is provided an image encoding apparatus for encoding image data of an encoding target in a raster scan order, comprising: a first encoding unit configured to encode a run length in which identical pixels continue; a second encoding unit configured to prediction-encode a pixel of an encoding target; a first determination unit configured to determine whether a pixel of interest is located within a predetermined range on a line on which the pixel of interest is located, thereby determining whether to apply the second encoding unit to the pixel of interest; and a second determination unit configured to, if the pixel of interest is located outside the predetermined range, determine, by referring to an already encoded pixel located around the pixel of interest, which one of the first encoding unit and the second encoding unit is to be applied to the pixel of interest.

According to the present invention, it is possible to further increase the encoding efficiency and also reduce redundant processing by selecting an appropriate encoding method in accordance with the position of an encoding target pixel.

Further features of the present invention will become apparent from the following description of exemplary embodiments (with reference to the attached drawings).

BRIEF DESCRIPTION OF THE DRAWINGS

FIG. 6 is a view showing the positional relationship between a coefficient of interest and peripheral coefficients;
FIG. 7 is a view for explaining a predetermined range;
FIG. 8 is a view for explaining Golomb-Rice encoding;
FIG. 9 is a view for explaining MELCODE encoding.

DESCRIPTION OF THE EMBODIMENTS

The embodiments of the present invention will now be described with reference to the accompanying drawings. Note that the embodiments to be described below are examples of detailed implementation of the present invention or detailed examples of the arrangement described in the appended claims.

First Embodiment

The first embodiment is applied to an encoding apparatus for encoding image data on a color component basis, and an image decoding apparatus for decoding image data. To make a detailed description, an example in which the apparatuses are mounted in an image capturing apparatus such as a digital camera will be explained. However, the generation source of image data to be encoded can be either a storage medium that stores the image data or a (server of a) network, and any type is possible.

Figure 1:
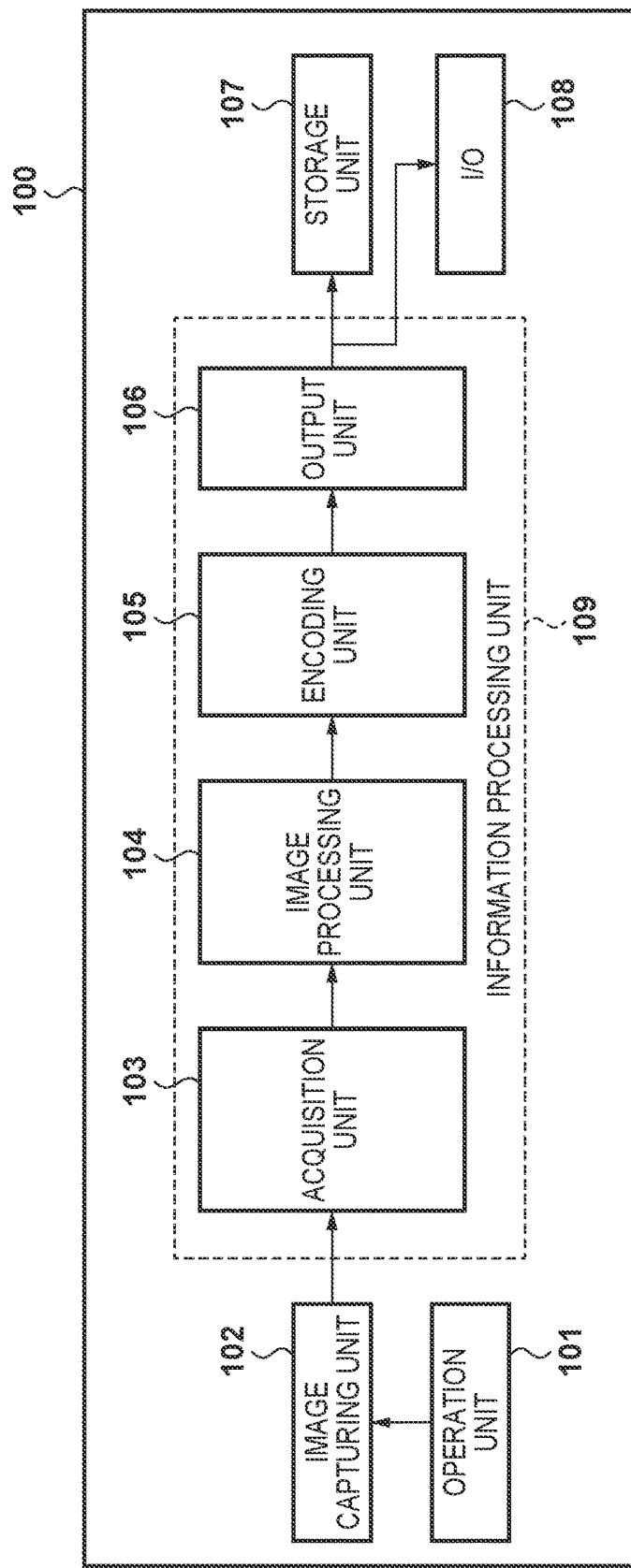
FIG. 1 is a block diagram of an image capturing apparatus.

FIG. 1 is a block diagram of an image capturing apparatus to which the image encoding apparatus according to the first embodiment is applied. An image capturing apparatus 100 includes an operation unit 101, an image capturing unit 102, an information processing unit 109, a storage unit 107, and an I/O interface 108. The information processing unit 109 includes an acquisition unit 103, an image processing unit 104, an encoding unit 105, and an output unit 106.

Figure 4A:
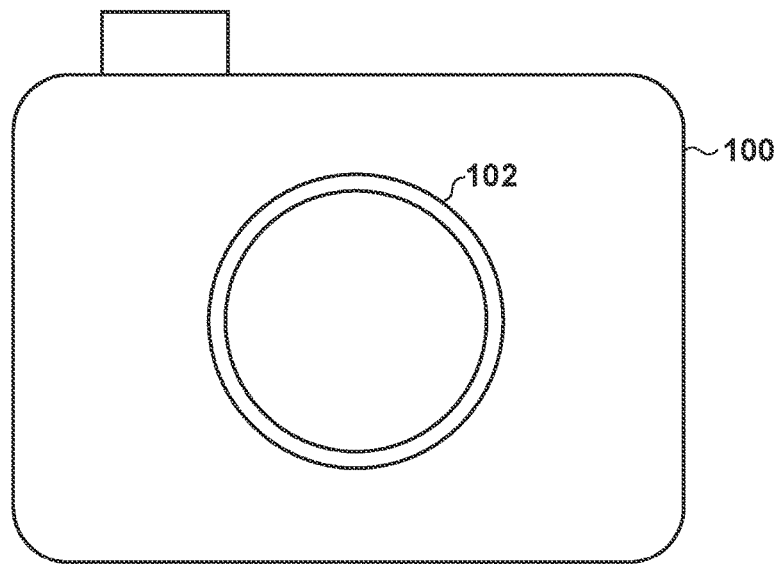
FIG. 4A is a view showing the outer appearance of a camera.
Figure 4B:
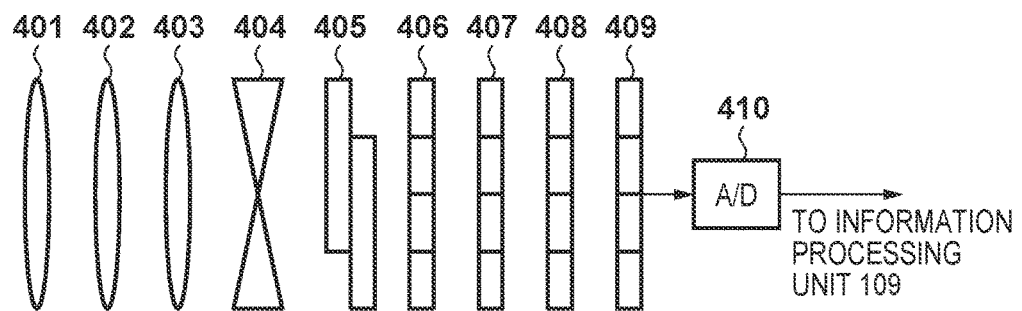
FIG. 4B is a block diagram of the image capturing unit of the camera.

FIG. 4A is a view showing the outer appearance of the image capturing apparatus 100. As shown in FIG. 4A, the image capturing apparatus 100 includes the image capturing unit 102. FIG. 4B is a block diagram showing the internal arrangement of the image capturing unit 102. The image capturing unit 102 includes a zoom lens 401, focus lenses 402 and 403, an aperture stop 404, and a shutter 405. The image capturing unit 102 also includes an optical low-pass filter 406, an IR cut filter 407, a color filter 408, an image sensor 409, and an A/D conversion unit 410. The user can adjust the amount of incident light on the image capturing unit 102 by adjusting the stop 404. The image sensor 409 is a light-receiving element such as a CMOS or CCD sensor. If the image sensor 409 detects the light amount of an object, the A/D conversion unit 410 converts the detected light amount into a digital value and outputs it as digital data to the information processing unit 109.

Figure 3:
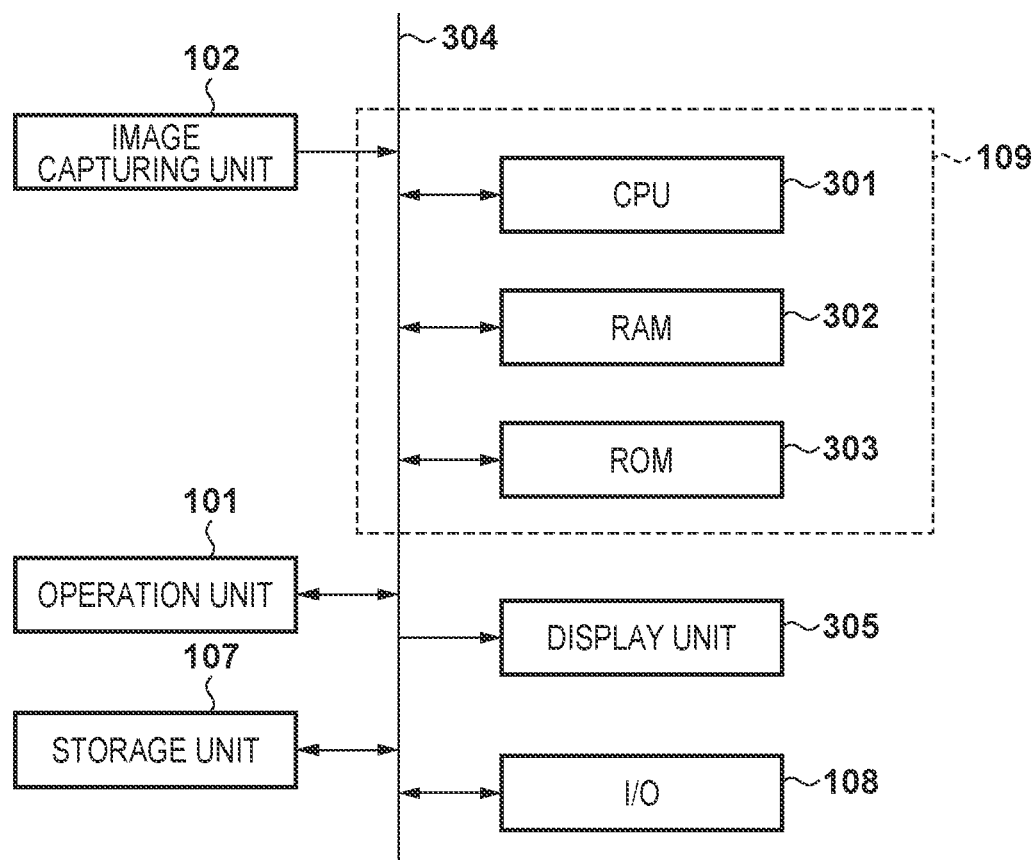
FIG. 3 is a block diagram showing the hardware arrangement of an information processing unit.

The image capturing apparatus 100 can be implemented by implementing the constituent elements shown in FIG. 1 by dedicated circuits or the like, but may also be implemented using a general-purpose CPU. An example in which the information processing unit 109 is implemented using a general-purpose CPU will be described here. FIG. 3 is a block diagram showing the internal arrangement of the image capturing apparatus 100 using the general-purpose CPU. The information processing unit 109 includes a CPU 301, a RAM 302, and a ROM 303, and the constituent parts are connected to each other by a system bus 304. The ROM 303 stores programs to be executed by the CPU 301 and various kinds of data. The RAM 302 is used as a work area or various kinds of buffers when the CPU 301 executes a program. The CPU 301 executes the programs stored in the ROM 303 and uses the RAM 302 as the work area or buffers, thereby functioning as the acquisition unit 103, the image processing unit 104, the encoding unit 105, and the output unit 106 and also performing control of the entire apparatus. Note that the arrangement of the information processing unit 109 may include not only the above-described elements but also dedicated processing circuits and the like functioning as the constituent parts shown in FIG. 1.

The operation unit 101 is an input device such as a button, a dial, or a touch panel provided on the image capturing apparatus man body. The user operates the operation unit 101, thereby inputting instructions to start/end shooting and set shooting conditions. The storage unit 107 is a nonvolatile storage medium such as a memory card capable of saving RAW image data acquired by the image capturing unit 102 and image data. The I/O interface 108 can use serial bus connection implemented by a universal serial bus (USB) and includes a corresponding USB connector. LAN connection by an optical fiber, wireless connection, or the like may be used, as a matter of course.

A display unit 305 displays a shot image or characters. As the display unit 305, a liquid crystal display is generally used. The display unit 305 may have a touch panel function. In this case, a user instruction using the touch panel may be handled as an input to the operation unit 101.

Processing of the information processing unit 109 shown in this embodiment will be described below. Based on an image capturing instruction from the user to the operation unit 101, the acquisition unit 103 acquires RAW image data output from the image capturing unit 102 and outputs the RAW image data to the image processing unit 104. The image processing unit 104 performs mosaicing for the RAW image data to generate image data including three, R, G, and B components per pixel, and outputs the generated image data to the encoding unit 105. The encoding unit 105 performs encoding processing of the image data. In this embodiment, one pixel expresses each of R, G, and B color components by 8 bits. A case in which image data is encoded as a monochrome image on a color component basis will be described as an example. That is, the encoding unit 105 independently encodes a monochrome multi-valued image of an R component, a monochrome multi-valued image of a G component, and a monochrome multi-valued image of a B component. Note that the encoding target image data is not limited to the RGB format, and may be data in another color space or RAW image data. For example, if one pixel includes Y, Cb, and Cr components each expressed by 8 bits, image data is encoded as a monochrome image on a component basis. When the processing is applied to RAW image data, the image sensor of the image capturing unit 102 has a Bayer arrangement (the arrangement of sets of 2×2 image sensors corresponding to R, G0, G1, and B color components). If the signal from each image sensor is expressed by 14 bits, monochrome multi-valued images formed from an R component, a G0 component, a G1 component, and a B component are encoded. Hence, the present application is not limited by the type of the color space of an image, the type of color components constituting an image, and the number of bits. Be sure that the encoding target image is assumed to have three, R, G, and B components each expressed by 8 bits (256 tones) strictly for the purpose of easy understanding.

Figure 2:
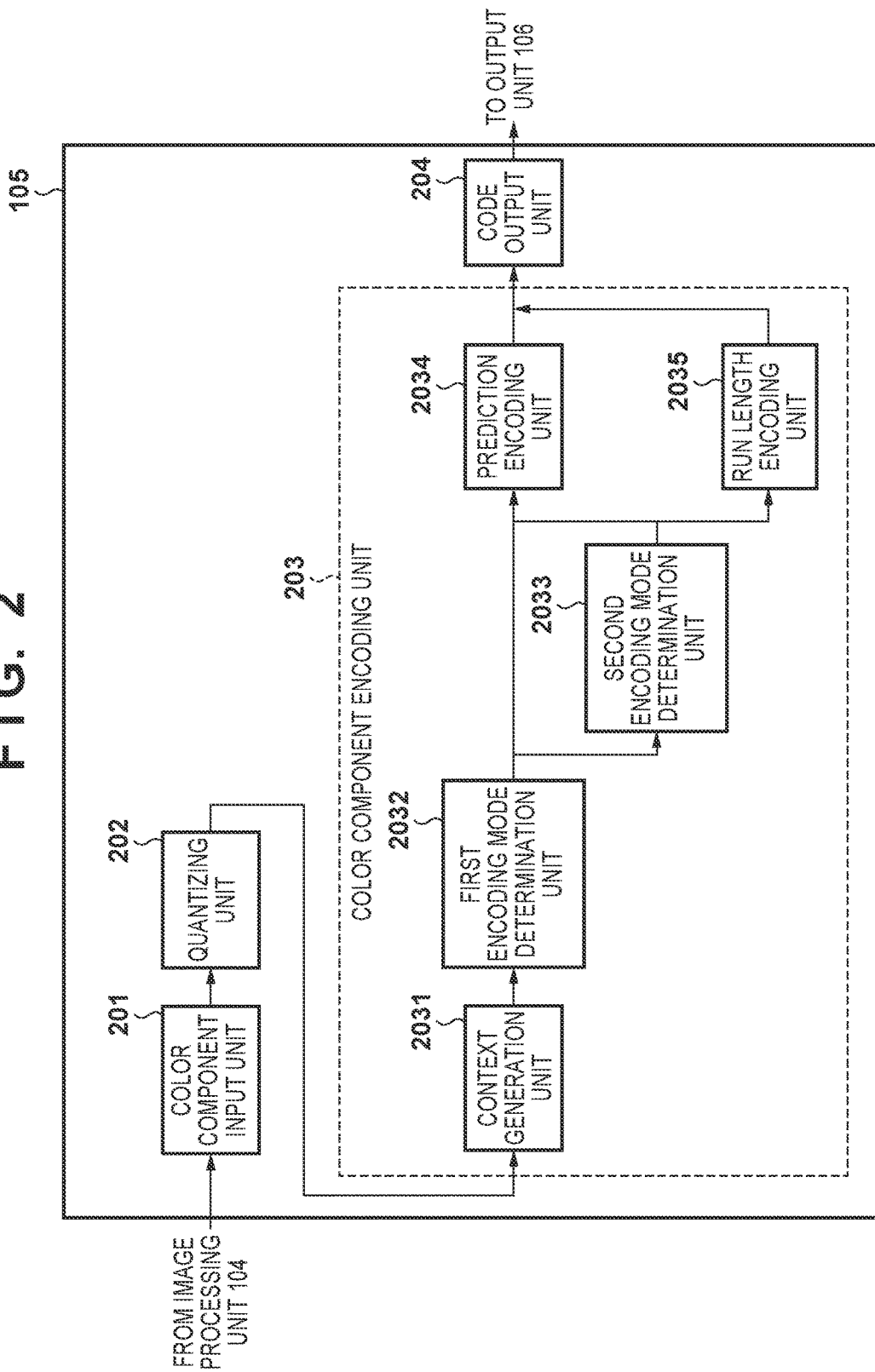
FIG. 2 is a block diagram showing an example of the arrangement of an encoding unit.
Figure 5:
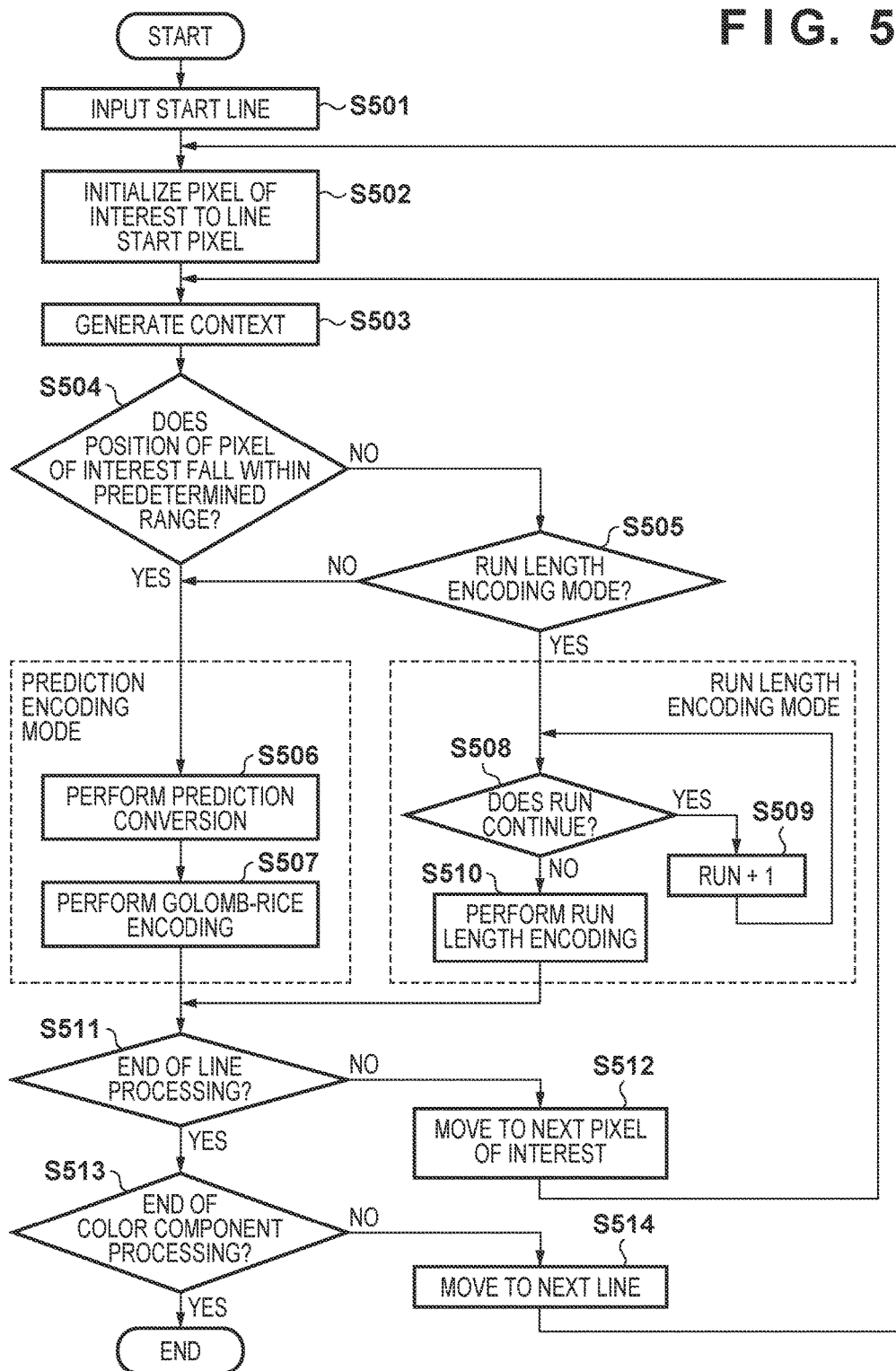
FIG. 5 is a flowchart showing processing of a color component encoding unit according to the first embodiment.

Processing of the encoding unit 105 according to this embodiment will be described. FIG. 2 shows the internal arrangement of the encoding unit 105. FIG. 5 is a flowchart showing encoding processing of image data of one color component (in the embodiment, one of R, G, and B) which is performed by the encoding unit 105. That is, actually, the processing shown in FIG. 5 is executed three times. Encoded data obtained as the result of performing the processing three times is put together to form one file.

A color component input unit 201 receives image data output from the image processing unit 104 on a component basis. In this embodiment, image data of R, G, and B components each formed from 8 bits are input on a color component basis. Since the R component, the G component, and the B component are handled as monochrome images, and the same processing is performed for them, the subsequent processing will be explained as processing of an 8-bit monochrome image. Note that encoding processing is performed for encoding target image data in the raster scan order.

A quantizing unit 202 receives the image data of each color component from the color component input unit 201 and performs quantization. Quantized pixel values are sent to a color component encoding unit 203. Note that when performing lossless encoding, this processing is skipped, and the pixel values of each color component are directly sent to the color component encoding unit 203.

The color component encoding unit 203 encodes the pixel values on a color component basis to generate encoded data. Details of the color component encoding unit 203 will be described later. When the encoding on a color component basis is ended, the generated encoded data is output to a code output unit 204. The code output unit 204 integrates the encoded data of the color components encoded up to this time and outputs compressed image data.

Referring back to FIG. 1, the encoding unit 105 sends the compressed image data to the output unit 106. The output unit 106 outputs the compressed image data to the storage unit 107 to save it. Note that the compressed image data may be output to a device outside the image capturing apparatus via the I/O interface 108.

The overall processing procedure of encoding image data on a color component basis has been described above. Encoding processing of image data of one color component performed by the color component encoding unit 203 will be described below with reference to FIG. 5. Note that S will represent a step in the flowchart hereinafter.

In step S501, the color component encoding unit 203 receives the pixel values (quantized values) of a color component of interest from the quantizing unit 202 on a line basis. The color component encoding unit 203 receives the pixel values of the color component on a line basis, and performs encoding while moving a pixel of interest as an encoding target in the raster scan order.

In step S502, the color component encoding unit 203 sets the pixel of interest as the encoding target at the left end position of a line. In step S503, a context generation unit 2031 performs context generation processing for the position of the pixel of interest. This processing is performed using the pixel of interest and already encoded peripheral pixels around the pixel of interest, like JPEG-LS. The relationship between the pixel of interest and the peripheral pixels will be described here. The color component encoding unit 203 according to this embodiment holds not only the line currently under encoding processing but also an encoded line (to be referred to as a preceding line hereinafter) of the immediately preceding line run in a buffer so that the line can be referred to. FIG. 6 shows the positional relationship between a pixel of interest and peripheral pixels on two lines, that is, a line of interest under encoding processing and a preceding line. A pixel x is the pixel of interest that is the encoding target pixel. Since the pixels are sequentially encoded in the raster scan direction, a left pixel a, an upper left pixel c, an upper pixel b, and an upper right pixel d are already encoded pixels. In JPEG-LS, as shown in FIG. 6, the differences between the pixels are obtained by referring to the four peripheral pixels (the left pixel a, the upper left pixel c, the upper pixel b, and the upper right pixel d) around the pixel of interest. Based on the differences, the data is divided into 365 contexts and encoded. Note that in the embodiment, symbols x, a, b, c, and d do not represent only pixel positions but are also be used as symbols representing the values (pixel values) of pixels.

The context generation unit 2031 according to the embodiment performs the same context generation processing as in JPEG-LS. The context generation method will be described with reference to FIG. 6. First, the context generation unit 2031 obtains the differences between the peripheral pixels a and c, c and b, and b and d. The differences are represented by D1, D2, and D3 given by $$D1 = d - b \quad (1)$$

$$D2 = b - c \quad (2)$$

$$D3 = c - a \quad (3)$$

The difference values D1, D2, and D3 are quantized to nine different values (from −4 to 4), and quantization values Q1, Q2, and Q3 of the differences are obtained. In the combination {Q1, Q2, Q3} of the obtained Q1, Q2, and Q3, since each of Q1, Q2, and Q3 has nine different values from −4 to 4, 9×9×9=729. The probability that a prediction error e occurs in the context {Q1, Q2, Q3} can be considered to equal the probability that a prediction error −e occurs in the context {−Q1, −Q2, −Q3}. Hence, the contexts are integrated to 365 values. Each context holds a sum A of the absolute values of prediction errors and an occurrence count N of the context as context information. These values are used when setting a parameter k for Golomb-Rice encoding to be described later. At the start of encoding, initial values are set to these values, and the values are updated as needed in the process of encoding processing, thereby dynamically following the probability distribution of each context.

At this time, depending on the position of the pixel of interest, for example, in a case in which the encoding target line is the first line of the input image or a case in which the pixel of interest is located at the left, a peripheral pixel is located outside the image data and cannot be referred to. At this time, pixels in number equal to the short peripheral pixels are extrapolated outside the image, like JPEG-LS.

Note that in this embodiment, four pixels around the pixel of interest are used as reference pixels, as in the JPEG-LS. However, to, for example, save the memory to hold context information, the number of peripheral pixels to be referred to may be decreased. For example, two peripheral pixels (for example, {a, b} or {a, d}) or three peripheral pixels (for example, {a, b, c} or {a, b, d}) may be used. Conversely, if the buffer memory has a sufficient capacity, more peripheral pixels may be referred to, and the context may be divided more finely to improve the encoding efficiency. The processing contents of the context generation unit 2031 have been described above.

Next, in step S504, depending on whether the coordinate position of the pixel of interest in the horizontal direction falls within a predetermined range, a first encoding mode determination unit 2032 determines whether to forcibly transition to a prediction encoding mode. In this embodiment, if at least one of the peripheral pixels referred to in the context generation of step S503 described above falls outside the right end of the image, the process forcibly transitions to the prediction encoding mode. The predetermined range here means the range of a predetermined number R of pixels on the line under the processing from a right end pixel Pend toward the start of the line, as shown in FIG. 7. More specifically, the difference (distance) between, of the peripheral pixels referred to in step S503, the pixel d having the most leading coordinate in the horizontal direction in the raster scan order and the coordinate of the pixel x of interest in the horizontal direction is set to R. For example, the peripheral pixels to be referred to in this embodiment are the pixels a, b, c, and d in FIG. 6. Of these pixels, the pixel most leading rightward in the horizontal direction with respect to the pixel x of interest is the pixel d. The distance of the pixel d from the pixel x of interest in the horizontal direction is 1. Hence, in this embodiment, R=1. If the pixel of interest exists within the predetermined range defined by R, the pixel of interest has a peripheral pixel to be referred to on the right side of the pixel of interest itself. Hence, the accuracy of context is not sufficient. In addition, the run hardly extends on the right side of the line. Hence, in this embodiment, the encoding mode is forcibly transitioned to the prediction encoding mode. Hence, if it is determined that the position of the pixel of interest falls within the predetermined range, prediction encoding from step S506 is performed. Otherwise, the process advances to step S505.

In step S505, a second encoding mode determination unit 2033 determines, based on the generated context, whether to transition to a run length encoding mode from the pixel of interest or prediction-encode the pixel of interest. More specifically, if D1, D2, and D3 obtained by equations (1) to (3) described above meet a condition: D1=D2=D3=0, it is determined to transition to the run length encoding mode. At this time, a run coefficient Rcoef=pixel a and a run length RL=0 are set, and encoding by a run length encoding unit 2035 is started. If the condition is not met, the prediction encoding mode is selected, and the process advances to step S506.

In steps S506 and S507, a prediction encoding unit 2034 obtains a prediction value p of the pixel x of interest and encodes the prediction error. Details will be described below.

First, in step S506, the prediction encoding unit 2034 obtains the prediction value p from the peripheral pixels around the pixel x of interest and calculates a prediction error Diff. In this embodiment, prediction is performed using MED (Median Edge Detection) prediction for prediction conversion. In this embodiment, the calculation of the prediction value p using the peripheral pixels shown in FIG. 6 is performed by $$p = \begin{cases} \max(a, b) & \text{if } c \leq \min(a, b) \\ \min(a, b) & \text{if } c \geq \max(a, b) \\ a + b - c & \text{otherwise} \end{cases} \quad (4)$$

Note that in this embodiment, MED prediction is used for prediction conversion. However, another prediction method such as previous-sample prediction (p=a) may be used, or p=0 may be set to prohibit prediction. In short, the same prediction method is used on the encoding side and on the decoding side. Next, the prediction error Diff is obtained. The prediction error is obtained by prediction error Diff=pixel value of pixel of interest−
prediction value=$x$−$p$ (5)

Next, in step S507, the prediction encoding unit 2034 Golomb-Rice-encodes the prediction error Diff. In this processing, the prediction encoding unit 2034 first converts the prediction error Diff into a nonnegative integer value MV. The conversion formula is $$MV = \begin{cases} 2 \times Diff & \text{If } Diff \geq 0 \\ -2 \times Diff & \text{otherwise} \end{cases} \quad (6)$$

Note that if the nonnegative integer value MV is even, the prediction error Diff has a positive value, and if the nonnegative integer value MV is odd, the prediction error Diff has a negative value, as can be seen from equation (6). Next, the prediction encoding unit 2034 Golomb-Rice-encodes the nonnegative integer value MV using the parameter k. The procedure of Golomb-Rice encoding is as follows.

(1) MV is expressed as a binary value, and 0s are arranged in number represented by a value obtained by shifting MV by k bits rightward, and 1 is added to the end.

(2) k lower bits of MV are extracted and added to the end of the value of (1).

FIG. 8 shows the relationship between the parameter k of Golomb-Rice encoding, the nonnegative integer value MV, and code words. The configuration of Golomb-Rice encoding is not limited to this. For example, a code may be formed by replacing 0 and 1 with each other. A code may be formed by reversing the order of (1) and (2) of the procedure described above. For example, consider a case in which parameter k=0. If the prediction error Diff is "−2", the nonnegative integer value MV is "3". If the prediction error Diff is "+2", the nonnegative integer value MV is "4". If the nonnegative integer value MV is 3, the code word is 4 bits "0001". If the nonnegative integer value MV is 4, the code word is 5 bits "00001".

A method of deciding the parameter k will be described here. The parameter k is decided using context information to which the pixel of interest belongs, as in JPEG-LS. More specifically, k is incremented from 0 until it meets occurrence count $N$ of context$\times 2^k \geq$ sum $A$ of absolute values of prediction errors (7)

The value k that meets inequality (7) for the first time is decided as the parameter k.

Note that this method of deciding the parameter k need only use the same parameter on the encoding side and on the decoding side, and another deciding method may be used. When the Golomb-Rice encoding is ended, the color component encoding unit 203 advances the process to step S511.

In steps S508 to S510, the run length encoding unit 2035 performs encoding processing of the length (run length) of consecutive identical pixel values. Details will be described below.

In step S508, the run length encoding unit 2035 determines whether a run continues. This determination is done based on whether the pixel x of interest has the same value as the run coefficient Rcoef as the current run target under the processing or whether the run has reached the right end pixel of the line as the encoding target. More specifically, if the pixel x of interest shown in FIG. 6 is different from Rcoef (pixel a) held in step S505, or if the run has reached the right end pixel of the line as the encoding target, it is determined that the run ends. Otherwise, it is determined that the run continues. Upon determining that the run continues, the run length encoding unit 2035 advances the process to step S509. Upon determining that the run ends, the run length encoding unit 2035 advances the process to step S510.

In step S509, the run length encoding unit 2035 increments (updates) the run length RL by "1" and move the pixel of interest to the next pixel. After that, the run length encoding unit 2035 returns the process to step S508.

In step S510, the run length encoding unit 2035 encodes the run length RL and outputs the code word. If the pixel x of interest is different from Rcoef (pixel a), the pixel on the left of the pixel x of interest serves as the run end, and the process advances to step S510, the pixel x of interest is not encoded. Hence, MELCODE encoding is performed, and termination processing is performed, as in JPEG-LS. The termination processing is processing of performing prediction encoding for the pixel x of interest based on the peripheral pixels. On the other hand, if the pixel x of interest remains the same as Rcoef (pixel a), and the run has reached the right end of the line, the termination processing is not performed because the pixel of interest is included in the code word of the run.

The procedure of MELCODE encoding is as follows for the most part. Note that see non-patent literature 1 for the exact contents of MELCODE encoding.

(1) Output of 0, subtraction of $2^{J[index]}$ from RL, and increment of index by 1 are repeated until RL<$2^{J[index]}$ is met.

(2) 1 is output to the end of the value of (1)

(3) J[index] lower bits of RL are output.

(4) If index is larger than 0, index is decremented by 1.

FIG. 9 shows an example of code words output by MELCODE encoding. The code words shown in FIG. 9 are output by the value of an array J[index] (held as a table) that uses, as an argument, the encoding parameter index that dynamically changes in the process of encoding, and stores the minimum value of the code length. The code word in each region with a horizontal line in FIG. 9 is not illustrated here because it depends on an algorithm for dynamically changing the encoding parameter index and is not uniquely decided. Encoding processing of the run length encoding unit 2035 has been described above.

Next, in step S511, the run length encoding unit 2035 determines whether encoding of all pixels on the line of interest as the encoding target has ended. If processing of all pixels on the line of interest has ended, the run length encoding unit 2035 advances the process to step S513. Otherwise, the run length encoding unit 2035 advances the process to step S512.

In step S512, the run length encoding unit 2035 moves the pixel of interest to the next pixel on the line of interest under the encoding processing, and returns the process to step S503.

In step S513, the run length encoding unit 2035 determines whether encoding of all lines in the color component under the processing has ended. If the encoding processing of all lines has ended, the color component encoding processing ends. Otherwise, the process advances to step S514. In step S514, the run length encoding unit 2035 updates the next line to the line of interest as the encoding target.

As described above, according to this embodiment, if a given pixel (the pixel d in FIG. 6) of peripheral pixels to be referred to when obtaining the context of the pixel of interest falls outside the image region, run length encoding is not employed, and prediction encoding is performed for the pixel x of interest. This is because even if run length encoding is performed from the pixel x of interest, the right end of the line is close, and a long run cannot be expected any more. In addition, a determination error occurs because of the shortage of peripheral pixels necessary for run length determination, and the encoding efficiency lowers. Regarding this point, in the embodiment, since the pixel of interest is encoded by prediction encoding in the above-described state, the encoding efficiency can be made higher than before. The resolution of a recent image capturing apparatus keeps on rising. The number of lines of a captured image also increases. It is therefore obvious that the functional effect becomes larger.

An image encoding apparatus according to the embodiment has been described above. An image decoding apparatus according to the embodiment will be described next.

Figure 14:
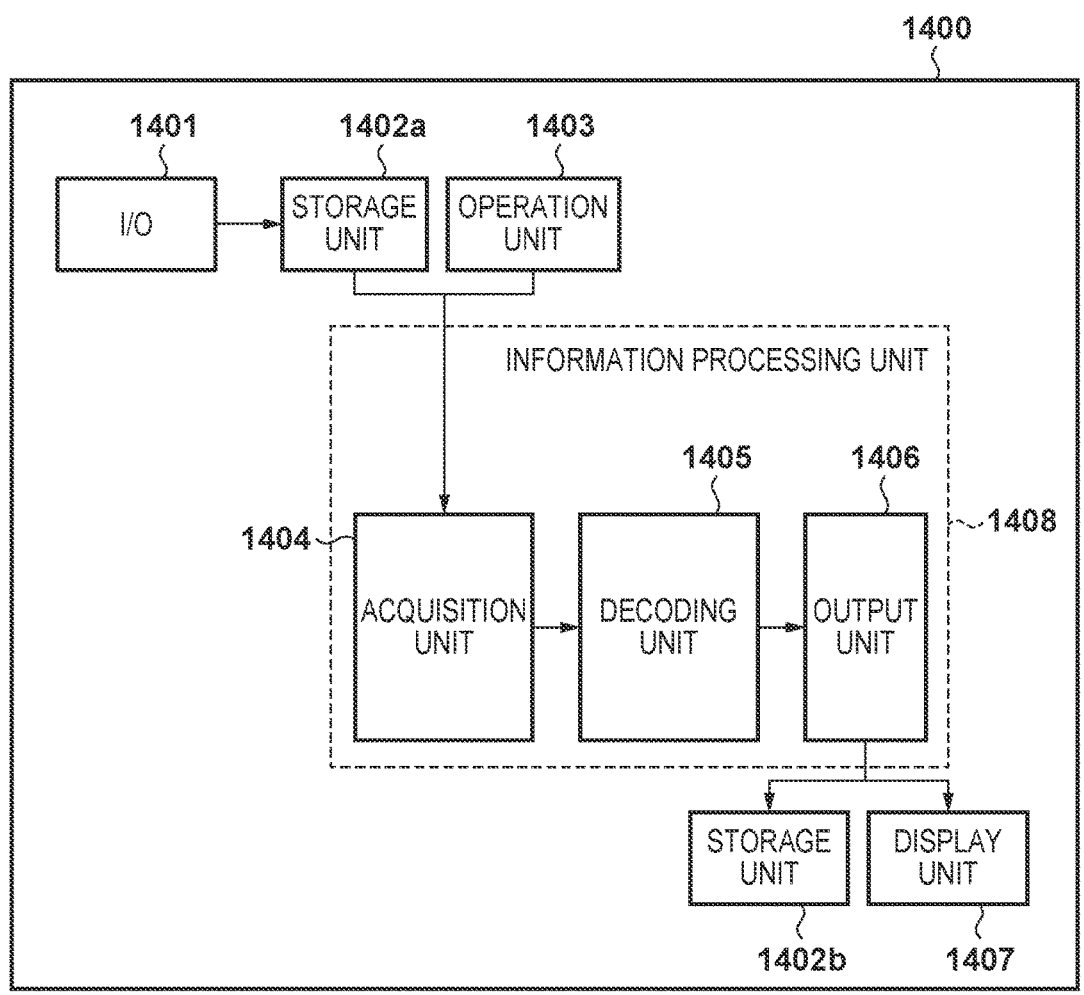
FIG. 14 is a block diagram showing an example of the arrangement of an image decoding apparatus.

FIG. 14 is a block diagram showing an example of the arrangement of an image decoding apparatus 1400 that performs image decoding in this embodiment. The image decoding apparatus 1400 includes an I/O interface 1401, storage units 1402a and 1402b, an operation unit 1403, an information processing unit 1408, and a display unit 1407. Note that although FIG. 14 shows the two storage units 1402a and 1402b, a single storage unit may be used.

The type of an apparatus that implements the image decoding apparatus 1400 is not particularly limited, and it is typically a computer or an image capturing apparatus. A description will be made assuming that the image decoding apparatus 1400 according to this embodiment is implemented in a computer such as a personal computer. The I/O interface 1401 includes a USB connector, like the I/O interface 108. The device 1400 acquires compressed image data output from the image capturing apparatus 100 via the I/O interface 1401.

The storage unit 1402a is a nonvolatile storage medium such as a memory card capable of saving compressed image data acquired from the I/O interface 1401. The operation unit 1403 is an input device such as a keyboard or a mouse provided on the computer. The user operates the operation unit 1403, thereby inputting instructions to do decoding processing and the like. The display unit 1407 can display a decoded image or the like, and a liquid crystal display is generally used. The internal arrangement of the information processing unit 1408 is the same as that of the information processing unit 109 shown in FIG. 1.

Processing of the information processing unit 1408 according to this embodiment will be described below. Based on a decoding instruction from the user to the operation unit 1403, an acquisition unit 1404 acquires compression-coded image data (a data file encoded in the embodiment) from the storage unit 1402a, and supplies the compression-coded image data to a decoding unit 1405.

The decoding unit 1405 performs decoding processing of the compression-coded image data and outputs image data obtained by decoding to an output unit 1406. The output unit 1406 outputs the image data to the storage unit 1402b or the display unit 1407. In this embodiment, one pixel expresses each of R, G, and B color components by 8 bits. A case in which image data is decoded as a monochrome image on a color component basis will be described as an example. That is, the decoding unit 1405 independently decodes a monochrome multi-valued image of an R component, a monochrome multi-valued image of a G component, and a monochrome multi-valued image of a B component.

Figure 15:
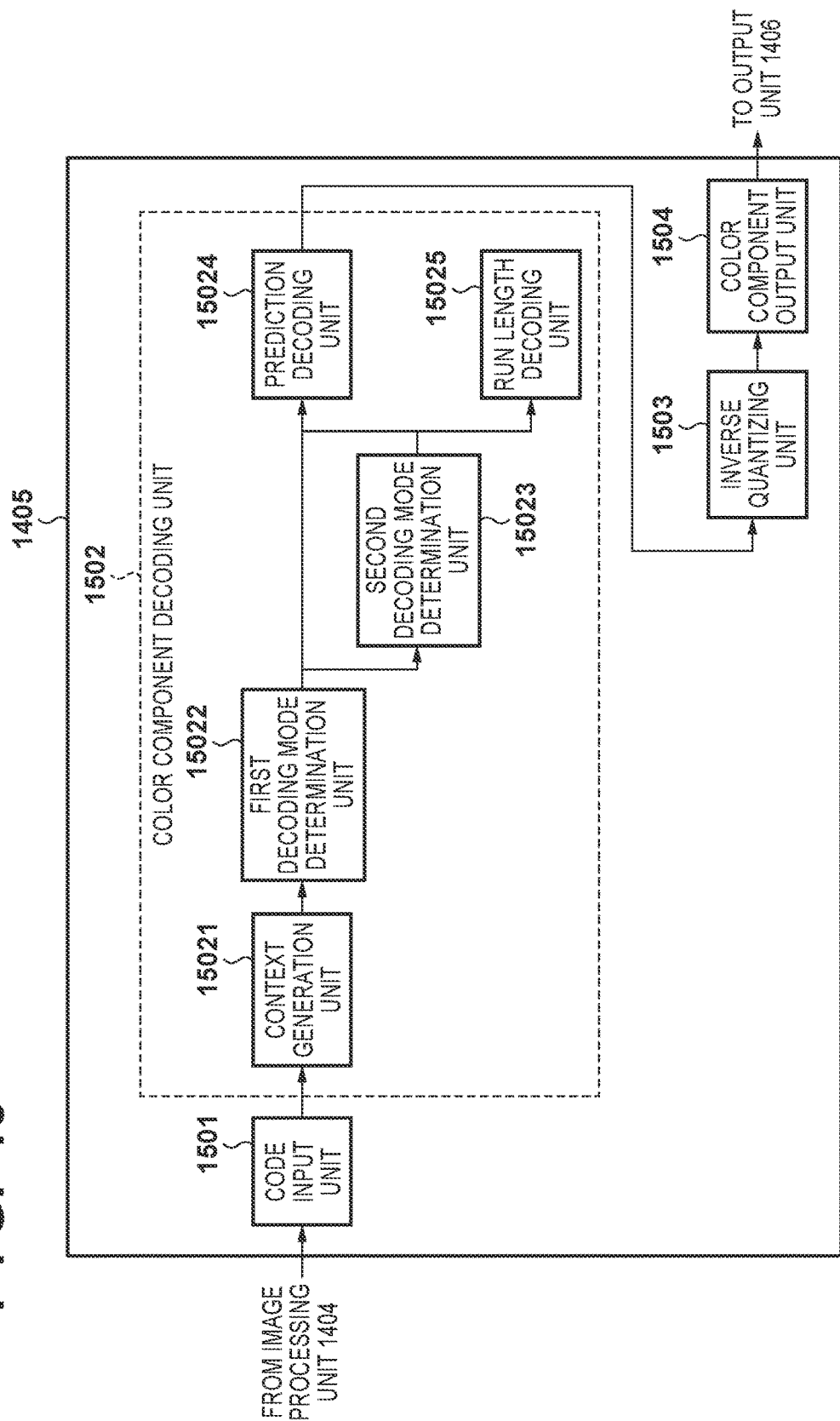
FIG. 15 is a block diagram showing an example of the arrangement of a decoding unit.

Processing of the decoding unit 1405 according to this embodiment will be described next. FIG. 15 shows the internal arrangement of the decoding unit 1405. The processing contents of the decoding unit 1405 will be described below with reference to FIG. 15. Note that here, decoding processing of encoded image data of one color component will be described. Note that in this embodiment, the number of color components is three, and actually, the processing to be described below is performed three times.

A code input unit 1501 receives compression-coded image data of one color component from the acquisition unit 1404. A color component decoding unit 1502 performs decoding processing of the compression-coded image data supplied and output from the code input unit 1501. Details of the color component decoding unit 1502 will be described below.

A context generation unit 15021 refers to already decoded peripheral pixels (see FIG. 6) near a pixel of interest of a decoding target, and performs context generation processing for the pixel of interest. This processing is the same as that of the context generation unit 2031 in the image capturing apparatus 100.

A first decoding mode determination unit 15022 determines whether to transition to the prediction decoding mode. This processing unit forcibly transitions to the prediction decoding mode if a peripheral pixel referred to by the context generation unit 15021 falls outside the right end of the image, like the first encoding mode determination unit 2032 in the image capturing apparatus 100.

A second decoding mode determination unit 15023 determines whether to transition to the run length decoding mode. In this processing, the determination is done using the context output from the context generation unit 15021, like the second encoding mode determination unit 2033 in the image capturing apparatus 100.

A prediction decoding unit 15024 obtains the pixel value of the pixel of interest from the prediction value of the pixel of interest and a decoded prediction error. More specifically, the processing is done in the following way.

First, the prediction decoding unit 15024 obtains the prediction value p of the pixel x of interest. At this time, the prediction method need only be the same as the method used in the prediction conversion processing of the prediction encoding unit 2034 in the image capturing apparatus 100.

Next, the prediction decoding unit 15024 entropy-decodes the encoded data based on Golomb-Rice decoding and obtains the nonnegative integer value MV. The procedure of Golomb-Rice decoding is as follows.

(1) A bit is extracted from the encoded data one by one, and the count is incremented as long as the extracted bit is "0". If the extracted bit is "1", the process advances to the next step (2). Here, the number of bits "0" is called ZEROcnt.

(2) ZEROcnt is shifted leftward by k bits. In addition, a value obtained by extracting k bits from the encoded data is added to ZEROcnt after the shift to obtain the symbol MV.

Next, the prediction decoding unit 15024 calculates the prediction error Diff from the symbol MV based on $$Diff = \begin{cases} \dfrac{MV}{2} & \text{(when } MV \text{ is even)} \\ -\dfrac{(MV+1)}{2} & \text{(when } MV \text{ is odd)} \end{cases} \quad (8)$$

Note that as the encoding parameter k, the same value as the parameter used on the encoding side is used on the decoding side. Next, the prediction decoding unit 15024 calculates the pixel value of the pixel x of interest in accordance with pixel x of interest=prediction error+prediction value=Diff+p (9)

With the above processing, the pixel value of the pixel of interest can be obtained based on the prediction value of the pixel x of interest and the decoded prediction error.

On the other hand, if the determination result of the second decoding mode determination unit 15023 indicates the run length decoding mode, a run length decoding unit 15025 determines that the encoded data is the encoded data of the run length RL, and decodes it. The run length RL need only be decodable by MELCODE decoding. For details of MELCODE decoding, see non-patent literature 1. The value of a pixel corresponding to the run length RL from the pixel x of interest is set to the prediction value (the left pixel a of the pixel x of interest) of the pixel x of interest. If the pixel to which the decoded pixel value is set has reached the end position (right end position) of the line, the pixel value setting is done up to the right end pixel of the line.

Next, termination processing of the line is performed. The termination processing is processing of performing prediction decoding of the pixel x of interest based on the peripheral pixels. However, if the pixel to which the pixel value is set has reached the end (right end) position of the line, the termination processing is not performed.

If the color component decoding unit 1502 is configured as described above, a decoded pixel value can be obtained on a color component basis.

An inverse quantizing unit 1503 receives the pixel values of the color components supplied from the color component decoding unit 1502 and inversely quantizes them. The step width of the inverse quantization need only be the same as that on the encoding side. The inverse quantizing unit 1503 outputs the pixel values after the inverse quantization to a color component output unit 1504. The color component output unit 1504 receives the pixel values of the color components supplied from the inverse quantizing unit 1503, and outputs them to the output unit 106 as color image data.

As described above, according to the image decoding apparatus of this embodiment, it is possible to decode encoded data by an encoding apparatus characterized by forcibly performing prediction encoding for pixels within a range in which the accuracy of context is not sufficient, and the run hardly becomes long.

Second Embodiment

Figure 10:
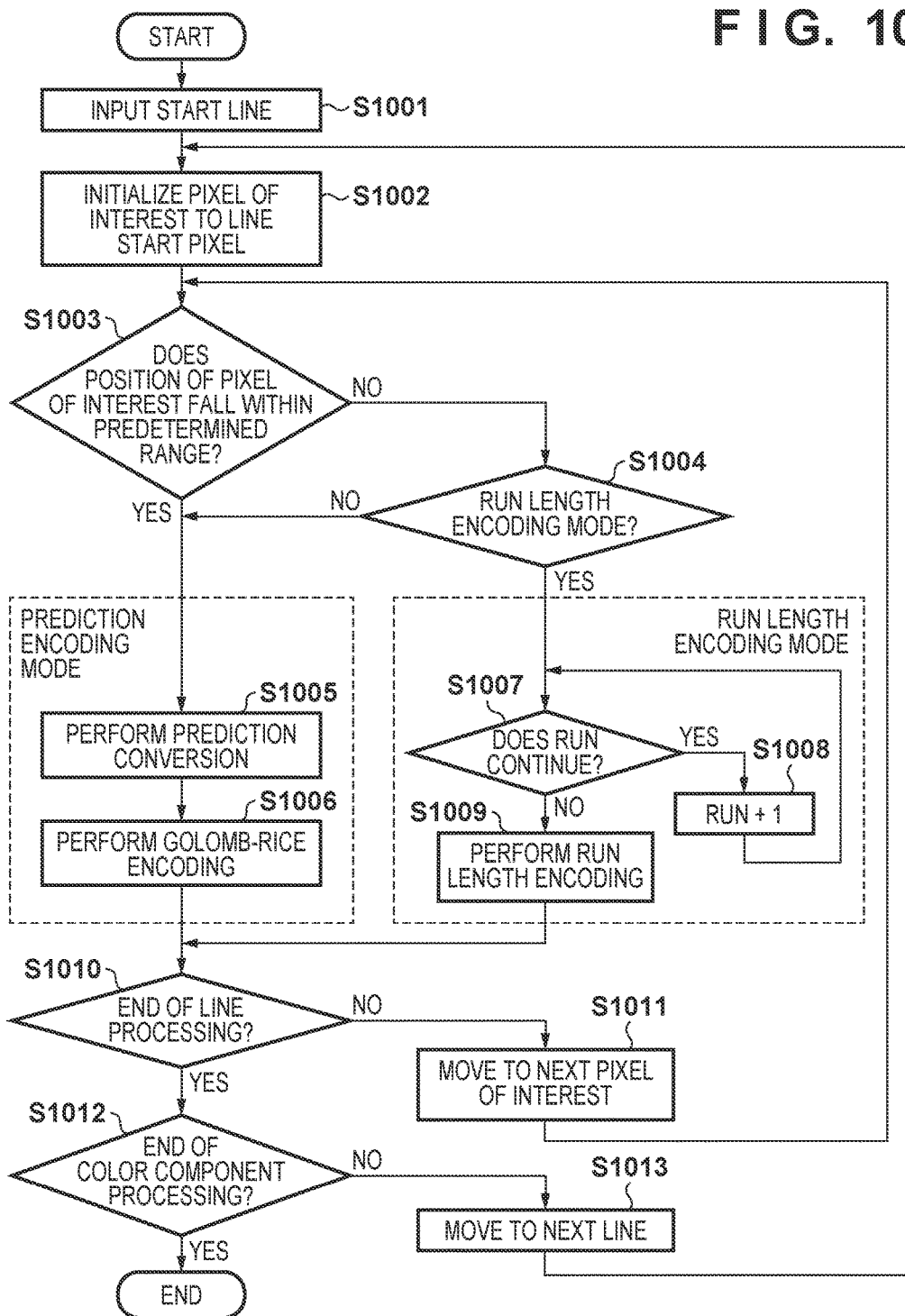
FIG. 10 is a flowchart showing processing of a color component encoding unit according to the second embodiment.

In the first embodiment, context generation is performed as in JPEG-LS, and based on the context, it is determined whether to shift to the run length mode, and the encoding parameter k in Golomb-Rice encoding is decided. With this arrangement, encoding can be performed in accordance with the peripheral state of the pixel of interest. It is therefore possible to improve the encoding efficiency. However, buffers for holding information are needed as many as the number of contexts. To solve this problem, an embodiment of encoding without context generation will be described below with reference to the flowchart of FIG. 10. Note that as for a decoding apparatus, decoding can be performed by applying the same change as in the encoding apparatus according to the first embodiment. FIG. 10 replaces FIG. 5 of the first embodiment. That is, be sure that a color component encoding unit 203 according to the second embodiment has the same arrangement as in FIG. 2 except that the context generation unit 2031 is omitted. Encoding processing of image data of one color component by the color component encoding unit 203 according to the second embodiment will be described below.

In step S1001, the color component encoding unit 203 receives the pixel values of a color component of interest on a line basis. In step S1002, the color component encoding unit 203 sets the pixel of interest as the encoding target at the left end position of a line.

In step S1003, it is determined whether the position of the pixel of interest falls within a predetermined range. In the first embodiment, this range is decided in accordance with peripheral pixels to be referred to in context generation. In the second embodiment, however, context generation processing is absent. Instead, the range is decided in accordance with peripheral pixels (to be described later) to be referred to in run length encoding mode shift determination in step S1004. Upon determining that the position of the pixel of interest falls within the predetermined range, the process advances to step S1005. Otherwise, the process advances to step S1004.

In step S1004, it is determined whether to shift to a run length encoding mode. A context is used for this determination in the first embodiment but not in the second embodiment. In the second embodiment, if peripheral pixels a, b, c, and d shown in FIG. 6 meet a condition given by $a=b=c=d$ (10)

it is determined to shift to run length encoding. If this condition is not met, it is determined to prediction-encode the pixel of interest.

That is, if equation (10) is met, the color component encoding unit 203 advances the process to step S1007. Otherwise, the process advances to step S1005.

In step S1005, a prediction encoding unit 2034 predicts the pixel value of the pixel of interest from the peripheral pixels and calculates a prediction error. This process can be the same as in step S506 of the first embodiment. After the prediction error is calculated, in step S1006, the color component encoding unit 203 Golomb-Rice-encodes a prediction error Diff. In this process, encoding is done using an encoding parameter k, as described in the first embodiment as well. However, since no context is generated, unlike the first embodiment, another method of deciding the parameter k is needed. In this embodiment, the parameter is dynamically updated in this step, as in MELCODE encoding. This method can be the same as in patent literature 2. The Golomb-Rice encoding method can be the same as in step S507 of the first embodiment. When the Golomb-Rice encoding is ended, the process advances to step S1010.

On the other hand, in step S1007, a run length encoding unit 2035 determines whether a run continues. This process can be the same as in step S508 of the first embodiment. Upon determining that the run continues, the process advances to step S1008. Otherwise, the process advances to step S1009.

In step S1008, the run length encoding unit 2035 updates a run length RL. This process can be the same as in step S509 of the first embodiment. When this process is ended, the process returns to step S1007. In step S1009, the run length encoding unit 2035 encodes the run length RL and outputs the code word. This process, including termination processing, can be the same as in step S510 of the first embodiment. When this process ends, the process advances to step S1010.

In step S1010, the color component encoding unit 203 determines whether encoding of all pixels on the line of interest as the encoding target has ended. If encoding processing of all pixels on the line of interest has ended, the process advances to step S1012. Otherwise, the process advances to step S1011.

In step S1011, the color component encoding unit 203 moves the pixel of interest to the next pixel on the line under the encoding processing, and returns the process to step S1003. In step S1012, the color component encoding unit 203 determines whether encoding of all lines in the color component under the processing has ended. If the encoding processing of all lines has ended, the color component encoding processing ends. Otherwise, the process advances to step S1013 to move the line of interest to the next line. After that, the process returns to step S1001.

With the above processing arrangement, since context generation processing can be omitted, buffer memories can be decreased. In addition, if it is determined in step S1003 that the position of the pixel of interest falls within the predetermined range, the processing can be transitioned to prediction encoding without referring to the peripheral pixels. It is therefore possible to reduce the processing amount and implement high-speed processing.

Third Embodiment

Figure 12:
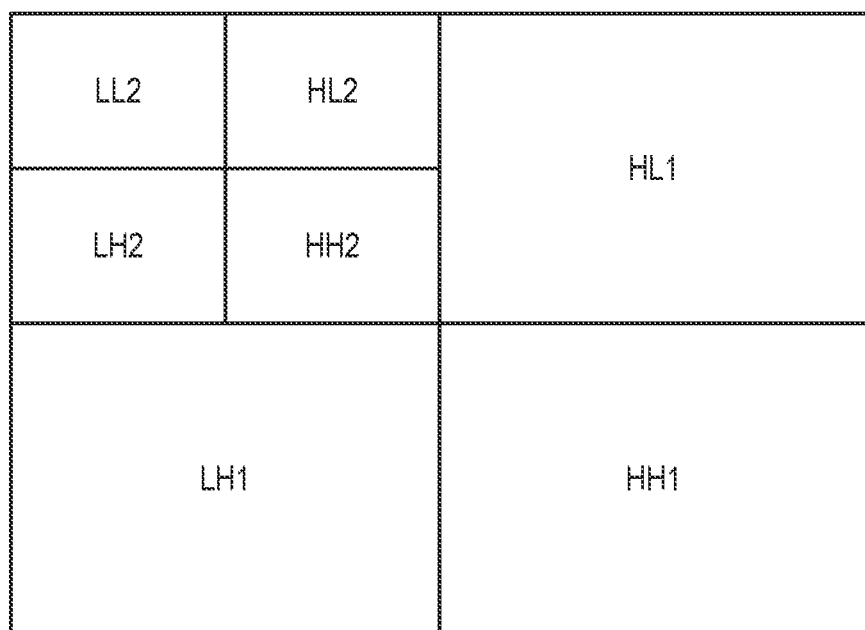
FIG. 12 is a view for explaining sub-bands obtained by wavelet transformation.

In the first embodiment, encoding is performed for each color component of image data, as shown in FIG. 2. However, the present invention is not limited to this, and can also be applied to a coefficient after conversion to a frequency band. At this time, if wavelet transformation that is one of frequency band conversion methods is performed, image data is divided into a plurality of decomposition levels, as shown in FIG. 12. Each decomposition level is formed from a plurality of wavelet coefficient groups (to be referred to as sub-bands hereinafter). The wavelet transformation can recursively be performed for a sub-band LL obtained by one transformation. The number of times of wavelet transformation execution represents the decomposition level. That is, if the decomposition level rises by one, the horizontal/vertical resolution halves. Encoding is performed while regarding each of a plurality of sub-bands obtained by the wavelet transformation as encoding target image data in the first and second embodiments and regarding a coefficient in each sub-band as a pixel.

Encoding/decoding processing may be applied for each sub-band in the wavelet transformation. At this time, an image is decomposed to a plurality of sub-bands and processed on a sub-band basis. Since the frequency that a pixel of interest (more exactly, a coefficient of interest) is located at the right end of a line rises, and the number of times of determining whether to transition to the forcible prediction encoding mode increases, the effect of this embodiment can be expected to be larger.

Figure 11:
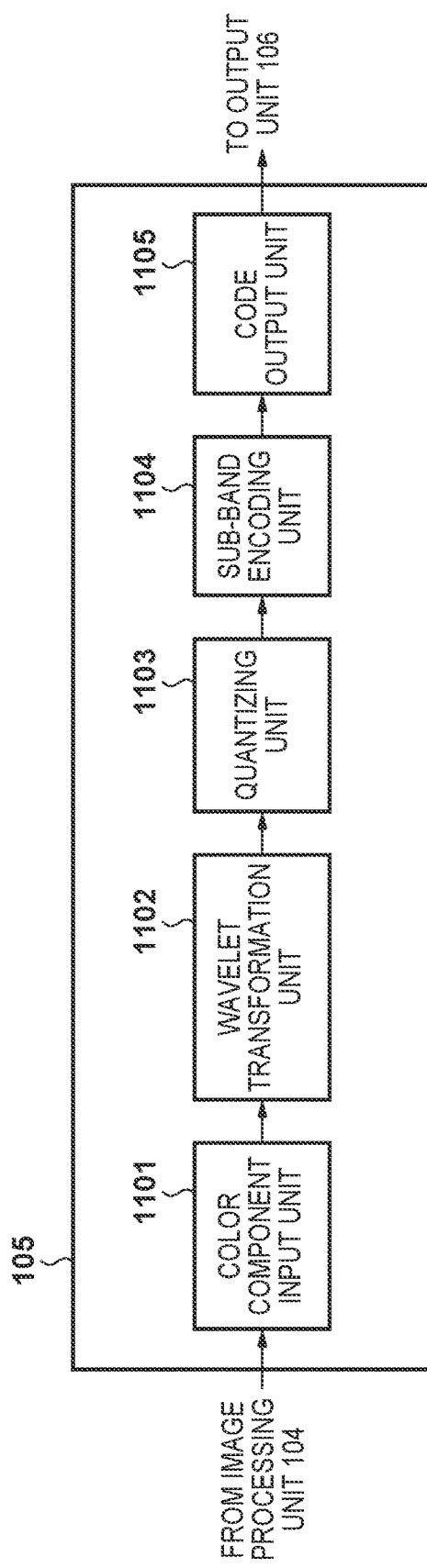
FIG. 11 is a block diagram showing an example of the arrangement of an encoding unit according to the third embodiment.

An image encoding apparatus using the wavelet transformation will be described as the third embodiment. Note that the arrangement of the apparatus is the same as in FIG. 1 except the arrangement of an encoding unit 105 in FIG. 1. FIG. 11 shows the arrangement of the image encoding unit 105 according to the third embodiment.

A color component input unit 1101 receives image data output from an image processing unit 104 on a component basis. In this embodiment, image data of R, G, and B components each formed from 8 bits are input on a color component basis. Since the R component, the G component, and the B component are handled as monochrome images, and the same processing is performed for them, the subsequent processing will be explained as processing of an 8-bit monochrome image.

A wavelet transformation unit 1102 receives the image data of each color component output from the color component input unit 1101, and performs wavelet transformation a predetermined number of times (twice in the embodiment). As a filter used in the transformation, a real-type 9/7 filter or an integer-type 5/3 filter used even in JPEG 2000 (ISO/IEC15444|ITU-T T.800) that is the international standard may be used. As for the processing unit of the wavelet transformation, the processing can be performed either on a line basis or on an image basis.

The wavelet transformation unit 1102 supplies each sub-band obtained by the wavelet transformation to a quantizing unit 1103. The quantizing unit 1103 receives the sub-band from the wavelet transformation unit 1102 and performs quantization on a sub-band basis. A quantized coefficient is sent to a sub-band encoding unit 1104. Note that when performing lossless encoding, the quantizing unit 1103 is unnecessary.

The sub-band encoding unit 1104 encodes each sub-band as shown in FIG. 12. The encoding processing is the same as that of the color component encoding unit 203 according to the first embodiment.

The color component encoding unit 203 according to the first embodiment regards each color component of an image as a monochrome image, and switches the encoding mode selection method in accordance with the position of an encoding target pixel in the image. In the third embodiment, the encoding target is not a pixel but a wavelet transformation coefficient. However, the encoding processing itself can be basically the same. More specifically, if a coefficient of interest falls within a preset range close to the right end of a line in a sub-band of interest, selection of run length encoding is prohibited. Note that the same encoding processing need not always be applied to the sub-bands, and the configuration may be changed in accordance with the sub-band portion. For example, in high-frequency sub-bands HL, LH, and HH other than the sub-band LL, since a value "0" is at the center, the condition is relaxed to facilitate shift to the run length mode, and the prediction method is changed. If the encoding on a sub-band basis has ended, the code is sent to a code output unit 1105.

The code output unit 1105 regards the encoded data of the sub-bands encoded up to this time as the encoded data of the color component of interest, integrates it with the encoded data of other color components, and outputs compression-coded image data of the original color image data.

If the encoding unit has the above-described arrangement, the present invention can also be applied to a coefficient after wavelet transformation, as can be understood. Note that concerning decoding, if the same decoding as that of the color component decoding unit 1502 according to the first embodiment is performed for the sub-bands, and inverse quantization and inverse wavelet transformation are performed, encoded data output from the encoding apparatus according to this embodiment can be decoded.

Fourth Embodiment

In the first embodiment, the range to forcibly shift to the prediction encoding mode in step S504 of FIG. 5 is decided in accordance with the peripheral pixels to be referred to in context generation. This deciding method makes it possible to forcibly prediction-encode pixels within a range in which the accuracy of context is not sufficient. However, it is also possible to define the range to shift to the prediction encoding mode by an encoding parameter index used in run length encoding. In the fourth embodiment, an example in which the range to forcibly shift to the prediction encoding mode is decided by index will be described.

In the fourth embodiment, a description will be made assuming that prediction conversion is not performed, the condition to shift to run length encoding is set to a=b=c=d=0, and an encoding parameter k of Golomb-Rice encoding is decided by the same method as in patent literature 2.

In MELCODE encoding used in run length encoding, the minimum number of bits to be output is decided by the encoding parameter index (except a case in which the run continues up to the end of the row). More specifically, J[index]+1 bits are output in the procedures (2) and (3) of MELCODE encoding described in the first embodiment. Like JPEG-LS, in this embodiment, the array J is given by
J[0, . . . 31]={0, 0, 0, 0, 1, 1, 1, 1, 2, 2, 2, 2, 3, 3, 3, 3, 4, 4, 5, 5, 6, 6, 7, 7, 8, 9, 10, 11, 12, 13, 14, 15}

Figure 13:
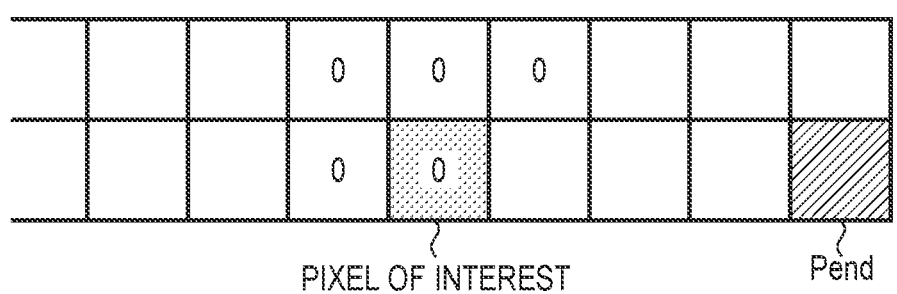
FIG. 13 is a view for explaining a predetermined range by an encoding parameter of MELCODE.

For example, if index=28, J[28]=12. That is, in this case, the code length of a generated code word is at least 12+1=13 bits irrespective of how long the run length is. At this time, assume that the shift to the run length mode occurs at the position of the pixel of interest five pixels back from the right end of the line, as shown in FIG. 13. In this case, it is determined that the run increases to five pixels at maximum. Even if the run increases to three pixels, 13 bits are needed for run length encoding, as described above. However, if the run of three pixels is expressed by Golomb-Rice encoding of k=0, three bits suffice. That is, the range in which run length encoding is effective can be defined by the relationship between J[index] of MELCODE encoding and the parameter k of Golomb-Rice encoding. Hence, in the fourth embodiment, a predetermined range R (see FIG. 7) is defined by $$R=(J[\text{index}]+1)/(1+k) \quad (11)$$

Note that k in equation (11) may permanently be set as a virtual value, and the predetermined range R may be decided by only J[index]. At this time, k is set to, for example, 0, 2, or the like. With the deciding method, the range to forcibly shift to the prediction encoding mode can be decided in consideration of an actual run length code. It is therefore possible to improve the compression ratio.

Other Embodiments

As described in the third embodiment, if the present invention is practiced for each sub-band obtained by wavelet transformation, the effect becomes larger. The effect can be made larger by further dividing the image into a plurality of blocks and performing encoding/decoding on a block basis.

In the above-described embodiments, the range to apply run length encoding is decided in accordance with the encoding parameter or the peripheral coefficients to be referred to for selection of an encoding method. However, any method of determining based on a position in an image whether run length encoding is effective and defining whether to set it as an encoding candidate is usable. The range may be decided in accordance with the feature of input image data. For example, in image data obtained by portrait shooting or macro shooting, the center of the image data is in the focus, and the remaining portions tend to blur. In such image data, since high-frequency components concentrate to the central portion of the image data, the same value can hardly continue. Hence, a method is also usable in which if the pixel of interest is located at the center of image data obtained by portrait shooting or macro shooting, run length encoding is not applied, and prediction encoding is performed, and run length encoding or prediction encoding is selectively applied for the remain portions.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-081466, filed Apr. 14, 2016, which is hereby incorporated by reference herein in its entirety.

What is claimed is:

1. An image encoding apparatus for encoding image data of an encoding target in a raster scan order, comprising:
a memory storing a program; and
one or more processors which execute the program, wherein the one or more processors function as:
a first encoding unit configured to encode a run length in which identical pixels continue;
a second encoding unit configured to prediction-encode a pixel of interest;
a first determination unit configured to determine whether the pixel of interest is located within a predetermined range on a line of the raster scan, thereby determining whether to apply the second encoding unit to the pixel of interest; and
a second determination unit configured to, if the pixel of interest is located outside the predetermined range, determine, by referring to an already encoded pixel located around the pixel of interest, which one of the first encoding unit and the second encoding unit is to be applied to the pixel of interest,
wherein the one or more processors, which execute the program, further function as a transformation unit configured to perform wavelet transformation,
wherein the image data of the encoding target comprises one sub-band of a plurality of sub-bands obtained by the transformation unit, and
wherein the pixel is a coefficient in the sub-band.

2. The apparatus according to claim 1, wherein the second encoding unit obtains a prediction value of the pixel of interest from a plurality of already encoded peripheral pixels around the pixel of interest and encodes a prediction error between the pixel of interest and the prediction value, and
letting R be a difference between, of the plurality of already encoded peripheral pixels, a pixel having a most leading coordinate in a horizontal direction in the raster scan order and a coordinate of the pixel of interest in the horizontal direction,
the first determination unit performs the determination using, as the predetermined range, a range represented by R from a right end position of the line on which the pixel of interest is located toward a start of the line.

3. The apparatus according to claim 1, wherein the second encoding unit obtains a context of the pixel of interest from a plurality of already encoded peripheral pixels around the pixel of interest and prediction-encodes the pixel of interest based on the context, and
letting R be a difference between, of the plurality of already encoded peripheral pixels, a pixel having a most leading coordinate in a horizontal direction in the raster scan order and a coordinate of the pixel of interest in the horizontal direction,
the first determination unit performs the determination using, as the predetermined range, a range represented by R from a right end position of the line on which the pixel of interest is located toward a start of the line.

4. The apparatus according to claim 1, wherein
the first encoding unit comprises an MELCODE encoding unit,
the second encoding unit comprises a Golomb-Rice encoding unit, and
letting index be an encoding parameter to be used by the MELCODE encoding unit, J[index] be a minimum value of a code length decided by the encoding parameter index, and k be an encoding parameter to be used in the Golomb-Rice encoding unit,
the first determination unit obtains R by $$R=\{J[\text{index}]+1\}/\{1+k\}$$

and performs the determination using, as the predetermined range, a range represented by R from a right end position of the line on which the pixel of interest is located toward a start of the line.

5. The apparatus according to claim 1, wherein the transformation unit performs the wavelet transformation on an image which is formed from pixels of one color component representing color image data.

6. A method of controlling an image encoding apparatus that includes a first encoding unit configured to encode a run length in which identical pixels continue, and a second encoding unit configured to prediction-encode a pixel of interest, and encodes image data of an encoding target in a raster scan order using one of the first encoding unit and the second encoding unit, the method comprising:
determining whether the pixel of interest is located within a predetermined range on a line of the raster scan, thereby determining whether to apply the second encoding unit to the pixel of interest; and
if the pixel of interest is located outside the predetermined range, determining, by referring to an already encoded pixel located around the pixel of interest, which one of the first encoding unit and the second encoding unit is to be applied to the pixel of interest,
wherein the method further comprises performing wavelet transformation,
wherein the image data of the encoding target comprises one sub-band of a plurality of sub-bands obtained in the performing of the wavelet transformation, and
wherein the pixel is a coefficient in the sub-band.

7. A non-transitory computer-readable storage medium storing a program which, when read and executed by a computer which comprises a first encoding unit configured to encode a run length in which identical pixels continue, and a second encoding unit configured to prediction-encode a pixel of interest, causes the computer to execute a method comprising:
determining whether the pixel of interest is located within a predetermined range on a line of the raster scan, thereby determining whether to apply the second encoding unit to the pixel of interest; and
if the pixel of interest is located outside the predetermined range, determining, by referring to an already encoded pixel located around the pixel of interest, which one of the first encoding unit and the second encoding unit is to be applied to the pixel of interest,
wherein the method further comprises performing wavelet transformation,
wherein the image data of an encoding target comprises one sub-band of a plurality of sub-bands obtained in the performing of the wavelet transformation, and
wherein the pixel is a coefficient in the sub-band.

8. An image encoding apparatus for encoding image data of an encoding target in a raster scan order, comprising:
one or more circuits, wherein the one or more circuits function as:
a first encoding unit configured to encode a run length in which identical pixels continue;
a second encoding unit configured to prediction-encode a pixel of interest;
a first determination unit configured to determine whether the pixel of interest is located within a predetermined range on a line of the raster scan, thereby determining whether to apply the second encoding unit to the pixel of interest; and
a second determination unit configured to, if the pixel of interest is located outside the predetermined range, determine, by referring to an already encoded pixel located around the pixel of interest, which one of the first encoding unit and the second encoding unit is to be applied to the pixel of interest,
wherein the one or more circuits further function as a transformation unit configured to perform wavelet transformation,
wherein the image data of the encoding target includes one sub-band of a plurality of sub-bands obtained by the transformation unit, and
wherein the pixel is a coefficient in the sub-band.

* * * * *